United States Patent
Tu et al.

[11] Patent Number: 6,157,466
[45] Date of Patent: Dec. 5, 2000

[54] HIDDEN DOCUMENT-FLATTENING DEVICE FOR SCANNER

[75] Inventors: Hsin-Hung Tu; Hsien-Che Hung, both of Hsinchu, Taiwan

[73] Assignee: Mustek System Inc., Hsinchu, Taiwan

[21] Appl. No.: 09/107,073

[22] Filed: Jun. 29, 1998

[30] Foreign Application Priority Data

Jul. 11, 1997 [TW] Taiwan ................................. 86211498

[51] Int. Cl.$^7$ ................................................. H04N 1/04
[52] U.S. Cl. ......................................................... 358/474
[58] Field of Search .................................... 358/474, 475, 358/497, 494, 496, 498, 486, 473, 488; 382/314, 372, 315, 321, 316

[56] References Cited

U.S. PATENT DOCUMENTS

| | | | |
|---|---|---|---|
| 4,563,771 | 1/1986 | Gorgone et al. | 382/135 |
| 5,101,287 | 3/1992 | Akuzawa | 358/496 |
| 5,258,858 | 11/1993 | Chow | 358/474 |
| 5,329,378 | 7/1994 | Lee | 358/406 |
| 5,610,720 | 3/1997 | Fujioka | 358/296 |
| 5,663,812 | 9/1997 | Pan | 358/474 |
| 5,708,516 | 1/1998 | Lin | 358/474 |
| 5,717,503 | 2/1998 | Chien | 358/475 |
| 5,790,278 | 8/1998 | Ehrne et al. | 358/496 |
| 5,850,296 | 12/1998 | Wang et al. | 358/474 |
| 5,894,355 | 4/1999 | Lin | 358/496 |
| 5,943,451 | 8/1999 | Lee | 382/313 |

*Primary Examiner*—Jerome Grant
*Attorney, Agent, or Firm*—W. Wayne Liauh

[57] ABSTRACT

A hidden document-covering device for a scanner, especially for a scanner built in the case of a computer in which a device is used for holding the document on a moving tray during scanning process. The document-covering device always hides itself in the case even when the tray moves out. During the scanning process, the document for scanning is firmly pressed onto the tray to prevent from curling or sliding. After scanning, i.e. when the tray moving out, the document-covering device will release the document for easy loading and unloading.

5 Claims, 5 Drawing Sheets

HIDDEN DOCUMENT-FLATTENING DEVICE FOR SCANNER

BACKGROUND OF THE INVENTION

1. Field of the Invention

The present invention relates to a hidden document-covering device for a scanner built in a case. The document-covering device is used for flattening the document firmly on a moving tray during scanning process in order to prevent the document from curling or sliding. The document-covering device always hides itself in the case even when the tray moves out. After the tray moves out, the document-covering device releases the document for easy loading and unloading.

2. Description of Related Art

In a built-in type scanner, the document to be scanned is held on a moving tray for passing across some scanning elements. The document must be flattened on the tray and prevented from curling or sliding during scanning process. So a document holding device is generally required.

A conventional design for this purpose is a holding plate covering the tray. It moves along with the tray as moving in and moving out of the case. The plate is hinged at the inner side of the tray and having a latch at the outer side. Users have to unlatch and open it before loading documents on the tray; and have to close and latch it before operating scanning. Otherwise, collision on the cover or malfunction of the device may occur.

Another kind of holding plate is designed to be opened sidewards. But it still has to be carefully handled by the user.

SUMMARY OF THE INVENTION

It is therefore a primary objective of the present invention to provide a document covering device for a built-in type scanner which can be operated automatically without user's handling. That is a covering device, hidden in the case, capable of firmly holding a document on the tray during scanning, and releasing the document after the tray moving out.

The other objectives and features of the present invention will become apparent from the following description of preferred embodiments with reference to the accompanying drawings.

DETAILED DESCRIPTION OF THE INVENTION

Figure 1:
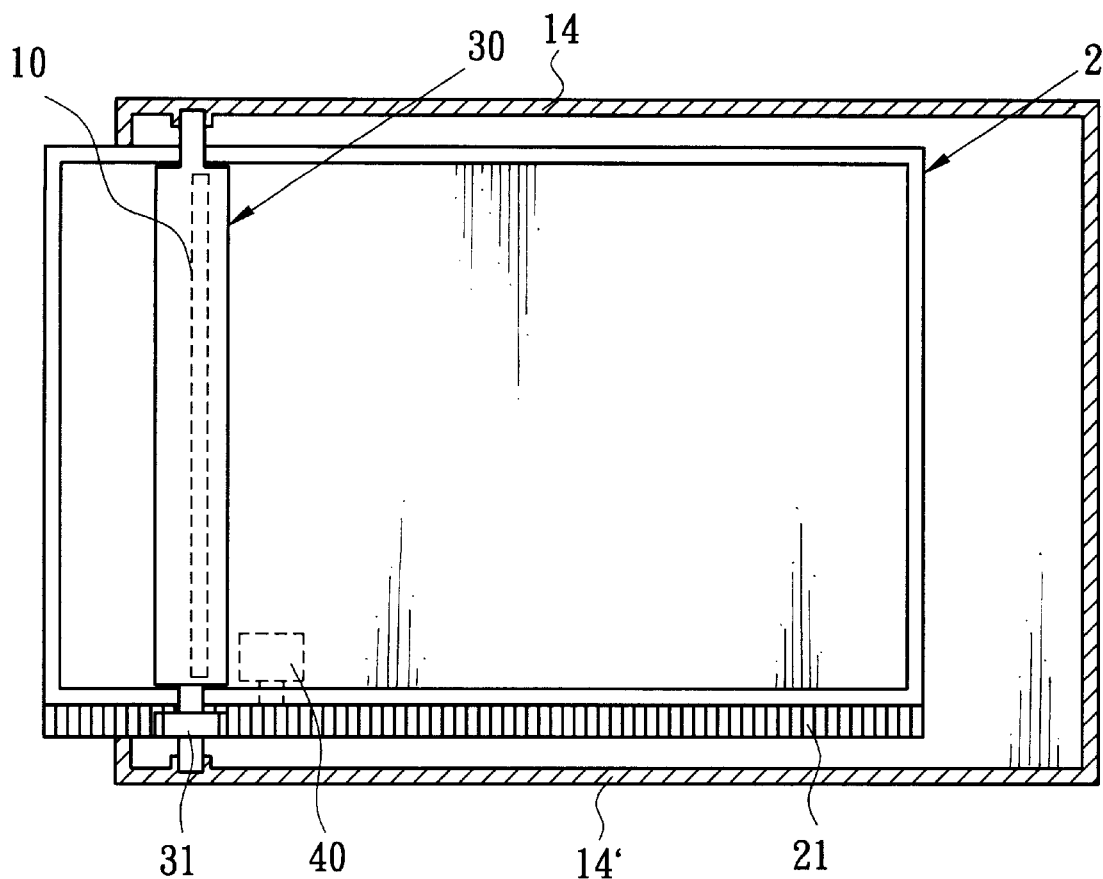
FIG. 1 is a plane view of a first embodiment of a covering device according to the present invention.
Figure 1A:
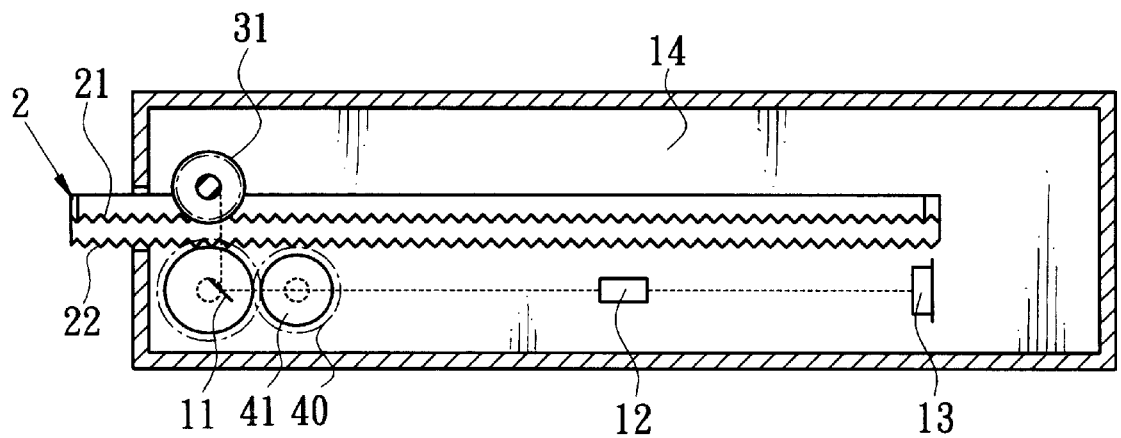
FIG. 1A is a side view of the device of FIG. 1.

In FIG. 1 and FIG. 1A, a first embodiment of a document-covering device according to the present invention is shown. Inside the scanner, there is a document scanning window 10 for the image of a document passing across, then reflected by a mirror 11, focused by lens 12, and then entering into an opto-electronic module, such as a CCD (charge couple device) or CIS (contact image sensor) array 13 and transformed into signals of image. A transparent tray 2 carries a document, such as a photo or other material, facing to and passing across the scanning window 10 for scanning, then moves out of the case for the user to load and unload the document (actually, the scanning widow 10 is a line portion projective on the surface of tray 2 where image of the document is scanned line by line). A covering device for flattening the document during scanning is a roller 30 located in parallel with the scanning window 10 and formed a touch line over the scanning window 10 where the roller will touch with the document to keep the document flaton the tray The roller 30 is adjacent to the tray 2 so that a document laid on the tray 2 will be pressed on it and moves along with the tray 2 during scanning process. The roller 30 pivots on two sides 14, 14' of the case. A first gear 31 furnished on one end of the roller 30 engages with a first rack 21 furnished on one side of the tray 2. A second rack 22 furnished also on the tray 2 is driven by a motor 40 via a gear 41. The linear transmission speed of the first gear 31 and first rock 21 is designed to be equal to the moving speed of the tray 2 driven by the motor 40 so that a document laid on the surface of the tray 2 and pressed by the roller 30 to move along with the tray during scanning will be exactly at the same tangent speed without sliding. After the scanning finishes, the tray 2 will be controlled to move outside the case where the roller 30 will no more press the document so that users can load and unload documents freely.

Figure 2:
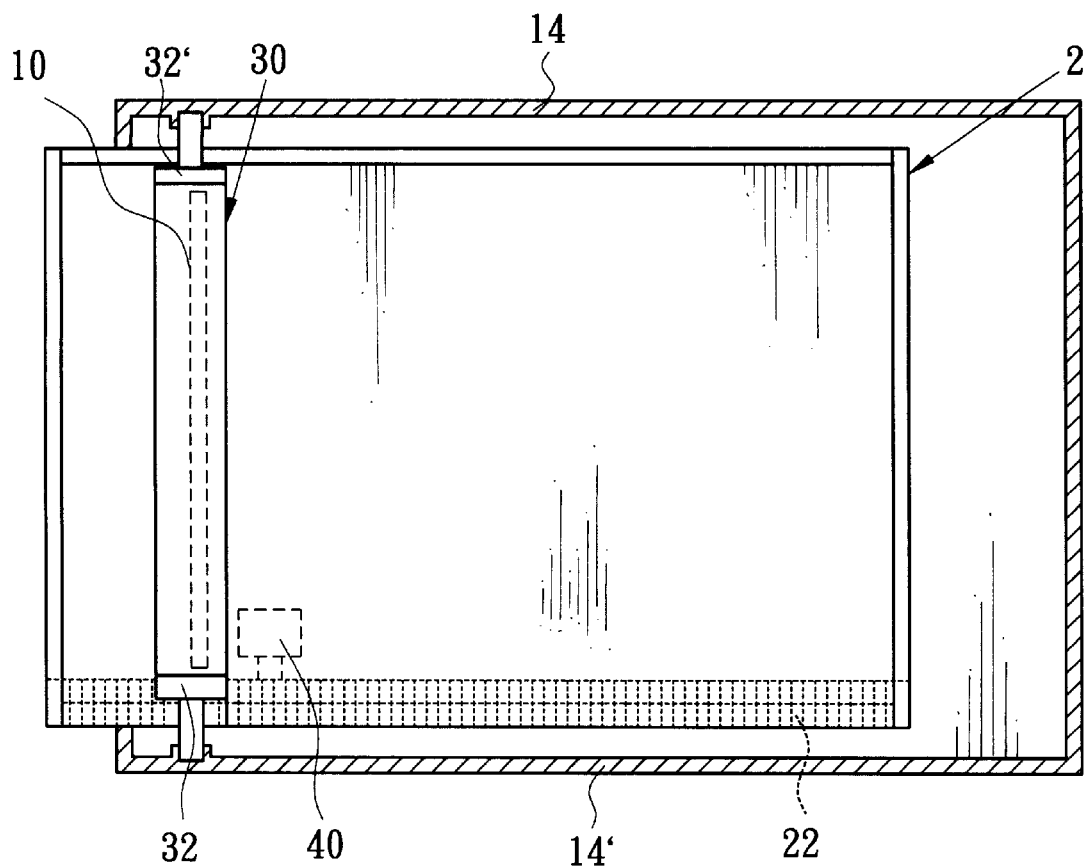
FIG. 2 is a plane view of a second embodiment of a document-covering device according to the present invention.
Figure 2A:
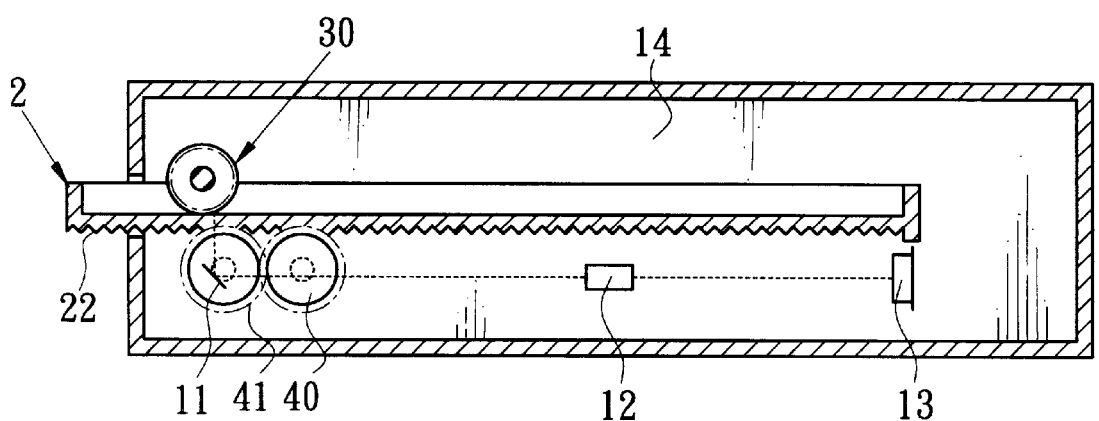
FIG. 2A is a side view of the device of FIG. 2.

In FIG. 2 and FIG. 2A, a second embodiment of a document-covering device according to the present invention is shown. It differs from the first embodiment at the modifications of aforesaid first gear 31 and first rack 21. Read of said gear and rack, two taking up wheels 32 and 32' are furnished on two ends of the roller 30 and directly contact with the tray 2. So that movement of the tray 2 will drive the roller 30 rotating in the same tangent speed. In the drawings, designated numbers for the rest components are the same as in FIG. 1 and FIG. 1A.

Figure 3:
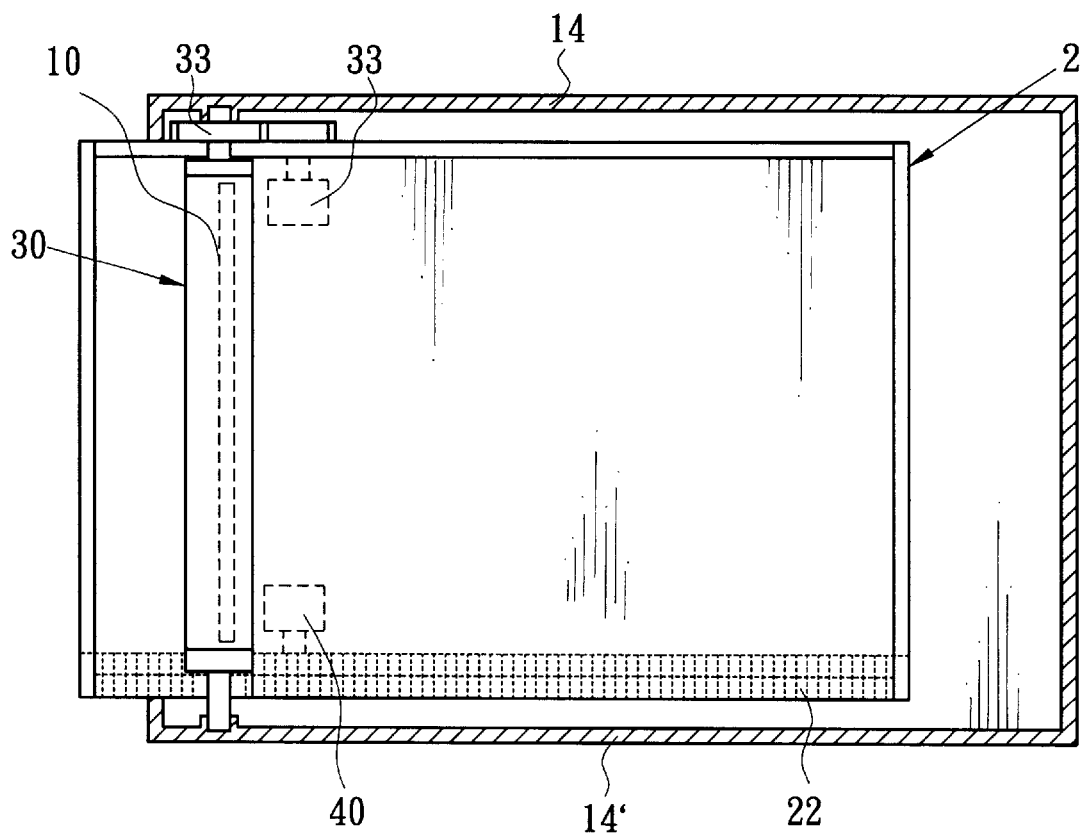
FIG. 3 is a plane view of a third embodiment of a document-covering device according to the present invention.
Figure 3A:
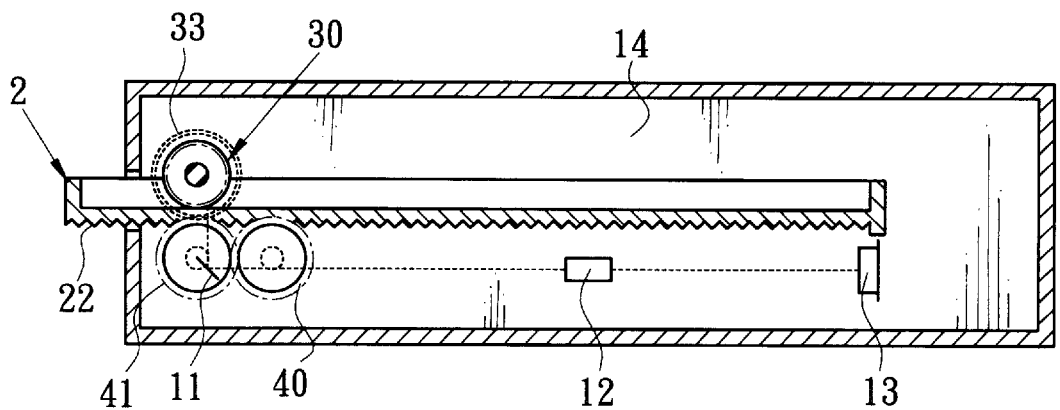
FIG. 3A is a side view of the device of FIG. 3.

In FIG. 3 and FIG. 3A, a third embodiment of a document-covering device according to the present invention is shown. It differs from the first embodiment at the modifications of aforesaid first gear 31 and first rack 21. Instead of said gear and rack, a second motor 34 is used to drive the roller 30 via a gear 33 fixed at one end of the roller 30. The rotation speed of the roller 30 is designed to be equal to the speed of the tray 2 driven by the motor 40 via the rack 22 and the gear 41. In the drawings, designated numbers for the rest components are still the same as in FIG. 1 and FIG. 1A.

Figure 4:
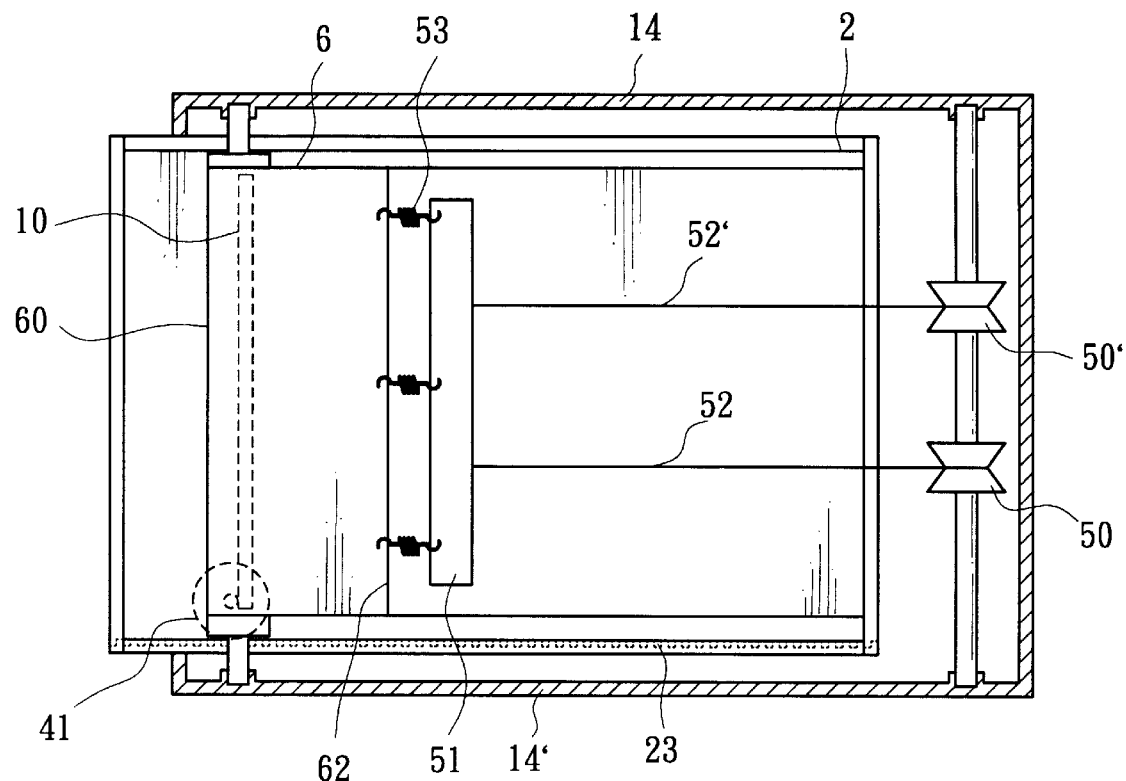
FIG. 4 is a plane view of a fourth embodiment of a document-covering device according to the present invention.
Figure 4A:
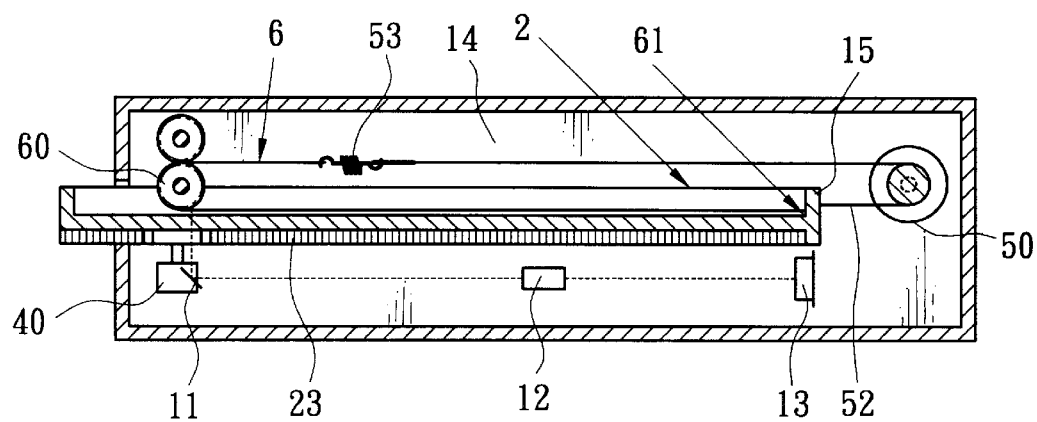
FIG. 4A is a side view of the device of FIG. 4.

In FIG. 4 and FIG. 4A, a fourth embodiment of a document-covering device according to the present invention is shown. The covering device includes a belt wheel 60, a flexible holding belt 6 (preferred of a transparent material) and driving means for actuating the belt 6. The axis of the belt wheel 60 is located adjacent and parallel to the scanning window 10. One end 61 of the belt 6 is fixed at the inner side 15 of the tray 2. The other end 62 of the belt goes around the belt wheel 6 to form a uniform small clearance between the belt and the tray 2 and then links to a pulling rim 51 via several spring elements 53, such as springs or rubber bands. Several pulleys 50, 51' furnished on a shaft which is pivoted on the case for several ropes 52, 52' going around respectively. The ends of the ropes 52, 52' are fixed on the rim 51 and the inner side 15 of the tray 2 respectively. The spring elements 53 provide a suitable tension in the circular linkage formed by the belt 6 and the ropes 52, 52'. During scanning process when the tray 2 is driven inward by a motor 40 via a gear 41 and a rack 23 furnished on the tray 2, the belt 6 will gradually cover a document laid on the tray 2 into the clearance between the belt and the tray and prevent it from sliding. The mirror 11, lens 12 and opto-electronic module 13 provide scanning functions as described above.

Figure 5:
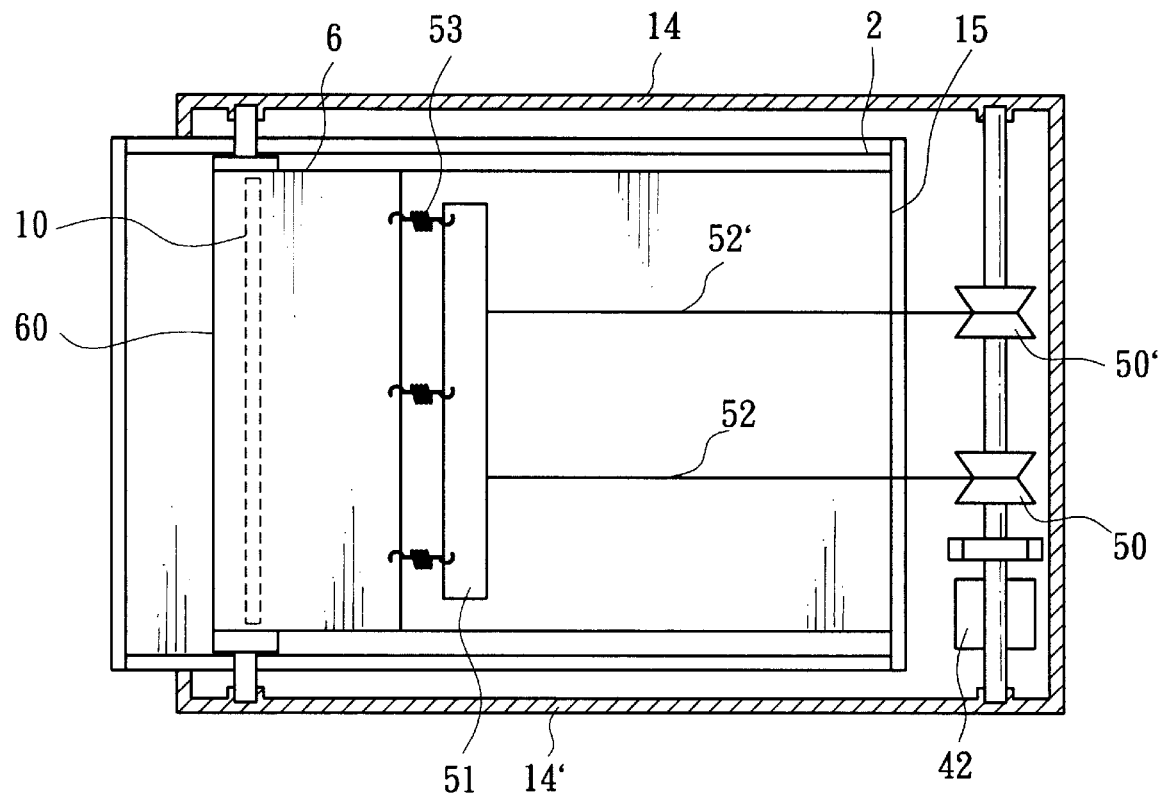
FIG. 5 is a plane view of a fifth embodiment of a document-covering device according to the present invention.
Figure 5A:
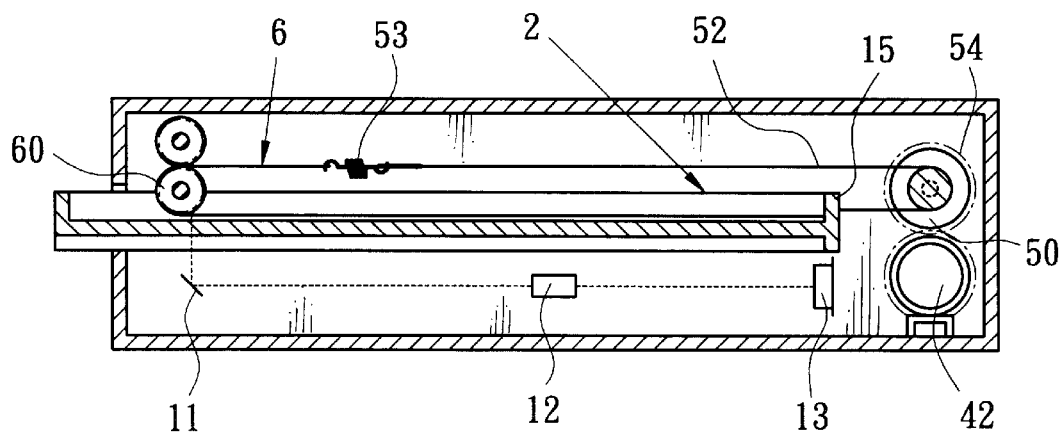
FIG. 5A is a side view of the device of FIG. 5.

In FIG. 5 and FIG. 5A, a fifth embodiment of a document-covering device according to the present invention is shown. It differs from the fourth embodiment at the modifications of aforesaid motor 40, gear 41 and rack 23. Instead of driving the tray 2 by gear and rack, a motor 42 is used to drive the shaft of the pulley 50, 50' directly via a gear 54, then pulls the belt 6 and the tray 2 moving synchronously via the rope 52, 52'.

In the aforesaid drawings of embodiments, light means for illuminating the documents to be scanned were not shown. It is apparent to those skilled in the art that light means can be located beyond or under the tray, and various changes for applying the invention to scan reflective or transparent documents may be made without departing from the scope of the invention disclosed.

What is claimed is:

1. A scanner with a hidden document-flattening device, comprising:

an elongated scanning window having a predetermined length;

a transparent tray for carrying a document placed on top thereof into a case of said scanner and passing across said scanning window to allow said document to be scanned; and a cylindrical roller hidden inside said case of said scanner arranged above said tray and in a parallel relationship to said elongated scanning window, said cylindrical roller having a length substantially equal to the length of said elongated scanning window and is structured to pivotally contact said tray at a contact line immediately before said scanning window so as to press said contact line portion of said document and keep said document flat on said tray immediately before said document passes across said scanning window.

2. A scanner with a hidden document-flattening device according to claim 1 wherein said cylindrical roller is pivotally mounted on said case.

3. A scanner with a hidden document-flattening device according to claim 2 wherein said tray is furnished with a rack at one side thereof and a gear furnished on one end of said cylindrical roller engages with said rack so that said roller is driven by said tray when said tray is driven by a driving motor.

4. A scanner with a hidden document-flattening device according to claim 2 wherein said cylindrical roller is furnished with two friction wheels at two ends thereof and contact with said tray so that said cylindrical roller is driven by said tray when said tray is driven by a driving motor.

5. A scanner with a hidden document-flattening device according to claim 2 wherein said cylindrical roller is driven by a driving motor and has a tangential speed equal to a tray moving speed.

* * * * *